United States Patent
Karnowski (10) Patent No.: US 6,304,644 B2
(45) Date of Patent: *Oct. 16, 2001

(54) APPARATUS AND METHOD FOR COST EFFECTIVE CALLER IDENTIFICATION AND CALL-WAITING FOR A MULTI-LINE TELEPHONE

(75) Inventor: Mark J. Karnowski, Long Beach, CA (US)

(73) Assignee: Casio Communications, Inc., Torrance, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,703

(22) Filed: May 6, 1998

(51) Int. Cl.[7] .................................................. H04M 1/00
(52) U.S. Cl. ................. 379/156; 379/93.23; 379/93.35; 379/157; 379/164; 379/142.01; 379/142.08; 379/93.07; 379/215.01
(58) Field of Search ............................ 379/88.21, 93.07, 379/93.23, 100.12, 156, 161, 177, 179, 202, 208, 93.35, 142.01, 142.08, 157, 164, 215.01

(56) References Cited

U.S. PATENT DOCUMENTS

| 3,665,112 | * | 5/1972 | Blake et al. | 379/158 |
| 5,056,133 | * | 10/1991 | Iida | 379/93.07 |
| 5,550,905 | * | 8/1996 | Silverman | 379/142 |
| 5,590,185 | * | 12/1996 | Sandler et al. | 379/163 |
| 5,636,034 | * | 6/1997 | Ishikawa | 358/434 |
| 5,754,635 | * | 5/1998 | Kim | 379/142.01 |
| 5,764,743 | * | 6/1998 | Goedken et al. | 379/156 |
| 5,872,839 | * | 2/1999 | Kang | 379/156 |
| 5,960,065 | * | 9/1999 | Beck et al. | 379/93.07 |
| 6,005,847 | * | 12/1999 | Gilbert et al. | 370/264 |
| 6,195,423 | * | 2/2001 | Smock et al. | 379/156 |

OTHER PUBLICATIONS

Technical Advisory, TA–NWT–000030, "Voiceband Data Transmission Interface Generic Requirements", Apr. 1992, Issue 3, BellCore.

Technical Reference, TR–NWT–000575, "Class[SM] Feature: Calling Identity Delivery on Call Waiting", FSD 01–02–1090, Oct. 1992, Issue 1, BellCore.

Technical Reference TR–NWT–0000575, "Class[SM] Feature: Calling Identity Delivery on Call Waiting", Dec. 1994, Revision 1 BellCore.

* cited by examiner

Primary Examiner—Ahmad Matar
Assistant Examiner—Bing Bui
(74) Attorney, Agent, or Firm—Frishauf, Holtz, Goodman, Langer & Chick, P.C.

(57) ABSTRACT

Consumer process equipment (CPE) for cost effective caller identification (CID) and call-waiting (CW) for a multi-line telephone includes a single CIDCW detection circuit and a single switch for coupling the single CIDCW detection circuit between a plurality of telephone lines. The CPE is able to process CIDCW information over a plurality of telephone lines by dynamically switching the single switch from one telephone line to another, depending upon the current state of the CPE.

34 Claims, 10 Drawing Sheets

APPARATUS AND METHOD FOR COST EFFECTIVE CALLER IDENTIFICATION AND CALL-WAITING FOR A MULTI-LINE TELEPHONE

BACKGROUND OF THE INVENTION

1. Field of the Invention

The present invention relates to customer premises equipment (CPE) (e.g. a telephone base and receiver unit) for use in telephone subscriber systems and more particularly to a customer premises equipment for use in telephone subscriber systems having caller identification (CID) and call waiting (CW) on a plurality of telephone lines.

2. Background Information

The call-waiting (CW) feature is generally well-known and available on many telephone systems (i.e., central offices). In conventional CW, when a subscriber to the CW service is engaged in a telephone conversation with a second party, the central office notifies the subscriber when a third party is attempting to call the subscriber. Typically, the central office notifies the subscriber of the incoming third party call by providing a CW tone or "click" which is audible to the subscriber. The subscriber then has the option to place the second party on hold and speak to the third party, or to ignore the CW signal and continue speaking to the second party.

Another service offered on some central offices is caller identification (CID). In the conventional CID feature the central office transmits a digitally encoded signal, representing the telephone number of a calling party, to a subscriber's customer premises equipment (CPE) (e.g., a telephone base and receiver unit). Provided that the subscriber's CPE is equipped with the appropriate receiving and decoding circuitry, the subscriber can view the calling party's telephone number on a display device and decide whether or not to answer the telephone call.

Some CPEs permit a subscriber to combine the CW and CID features in a single CPE (for example, CIDCW CPE) whereby the subscriber's CIDCW CPE displays a third party's CID information, (for example, the third party's name, telephone number, and any other information transmitted from the central office) while the subscriber is in communication with a second party. This allows the subscriber to make an informed decision as to whether or not to interrupt a current telephone call with the second party in order to answer the incoming call from the third party.

Some subscribers find it convenient to have access to multiple telephone lines. Although there are various CPEs capable of handling multiple telephone lines, should a subscriber want to implement the CIDCW feature on each of the telephone lines, a separate CIDCW CPE for each of the telephone lines is generally required. Obviously, this can be cumbersome and expensive for the user.

One solution may be to combine the circuitry from multiple CIDCW CPEs under a single housing. If so, the number of circuit elements needed to process CIDCW information for a single telephone line would be multiplied by the number of telephone lines the CPE is capable of handling. That is, for example, a two line CIDCW CPE would have two CID detectors (i.e., a separate CID detector for each telephone line). Of course, as the number of circuit elements within a CPE are multiplied, the size and cost of the CPE increases. Clearly, there is a need for a cost-effective CPE and method that is capable of detecting, receiving and processing CID information over a plurality of telephone lines.

The CID and CIDCW features are well-known and are described in TR-NWT-000030, *Voiceband Data Transmission Interface Generic Requirements*, Issue 3 (Bellcore, April 1992) and TR-NWT-000575, *CLASS Feature: Calling Identify Delivery on Call Waiting*, FSD 01-02-1090, (A module of LSSGR, FR-NWT-000064) Issue 1 (Bellcore, October 1992), plus Revision 1, December 1994, the entire disclosure of each is incorporated herein by reference.

OBJECTS AND SUMMARY

It is therefore an object of the present invention to provide a multiple line customer premises equipment (CPE) that is capable of receiving caller identification (CID) information over a plurality of telephone lines.

It is another object of the present invention to provide a multiple line CPE that is capable of handling the caller identification and call-waiting (CIDCW) feature over a plurality of telephone lines.

It is a further object of the present invention to provide a cost-effective multiple line CPE capable of handling caller identification (CID) information with or without the call-waiting feature (CW) over a plurality of telephone lines.

It is yet another object of the present invention to provide a multiple line CPE that utilizes a single circuit for detecting CID information over a plurality of telephone lines.

It is yet a further object of the present invention to provide a multiple line CPE that is capable of selectively enabling and disabling the CID feature over any of the plurality of telephone lines.

It is still another object of the present invention to provide a multiple line CPE that is capable of selectively enabling and disabling the CW feature over any of the plurality of telephone lines.

It is still a further object of the present invention to provide a multiple line CPE that determines, based on a set of priorities, which one of a plurality of telephone lines on which to receive CID information.

It is yet still another object of the present invention to display received CID information and on which of the plurality of telephone lines the CID information is received.

In accordance with one form of the present invention, a customer premises equipment (CPE) is provided that is capable of accepting a plurality of telephone lines and receiving caller identification (CID) information from a central office on each of the plurality of telephone lines.

According to an embodiment of the present invention, the CPE is able to process CID information over a plurality of telephone lines by dynamically switching the connection of a CID detector from one telephone line to another, depending on the current state of the CPE. For example, in a two-line, CIDCW embodiment of the present invention, if the CPE is first engaged on Line-1 and a ring is received on Line-2, the CID detector is switched to Line-2 in order to detect the CID information. After the CID information from Line-2 is received, if Line-1 is still off-hook, the CID detector is reconnected to Line-1 in order to be able to detect CIDCW information from a second call on Line-1. It should be noted that during this process, the telephone conversation on Line-1 is allowed to proceed uninterrupted. However, if Line-1 is no longer off-hook and Line-2 is now off-hook, the CID detector remains coupled to Line-2. When Line-2 goes back on-hook, the CID detector reconnects to Line-1.

Switching a single CID detector between multiple telephone lines prevents the user from simultaneously receiving CID information over multiple telephone lines. However, the probability of receiving simultaneous telephone calls, particularly for a two-line CPE, has been determined to be relatively low. Therefore, the cost-savings in using the fewer components justifies the loss of that feature. Furthermore, since typical display components (i.e. liquid crystal displays) incorporated in most CID CPEs will display only one set of CID information at a time, simultaneously received CID information could not be simultaneously displayed.

Still further, a user may choose not to subscribe to the CID or CIDCW feature for all of the available telephone lines or may choose not to utilize all of the available telephone line connections. Therefore, it would not be necessary for the CPE to switch the CID circuitry to those telephone lines which do not subscribe to the CID and/or CIDCW feature or to the telephone lines that are not connected to the CPE. In an embodiment of the present invention where a telephone line is connected to the CPE but does not subscribe to the CID or CIDCW feature, the user may selectively disable the CID or CIDCW feature for the specified telephone lines, to prevent the CID/CIDCW circuit from unnecessarily connecting to a particular telephone line. Hereinafter, the CID or CIDCW feature is considered "enabled" if the user subscribes to the respective feature and the CPE is not prevented from accepting any aspect of the respective feature.

A user may incorporate the present invention in any number of devices available, including a corded telephone, a base unit speakerphone, a cordless handset, a computer having a modem, a video phone, or a facsimile machine.

A preferred form of the apparatus and method which provides a cost effective CID and CW for a multiline telephone, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 8b is a flow diagram showing a continuation of the partial flow diagram of FIG. 8a.

DETAILED DESCRIPTION OF THE PREFERRED EMBODIMENTS

Figure 1:
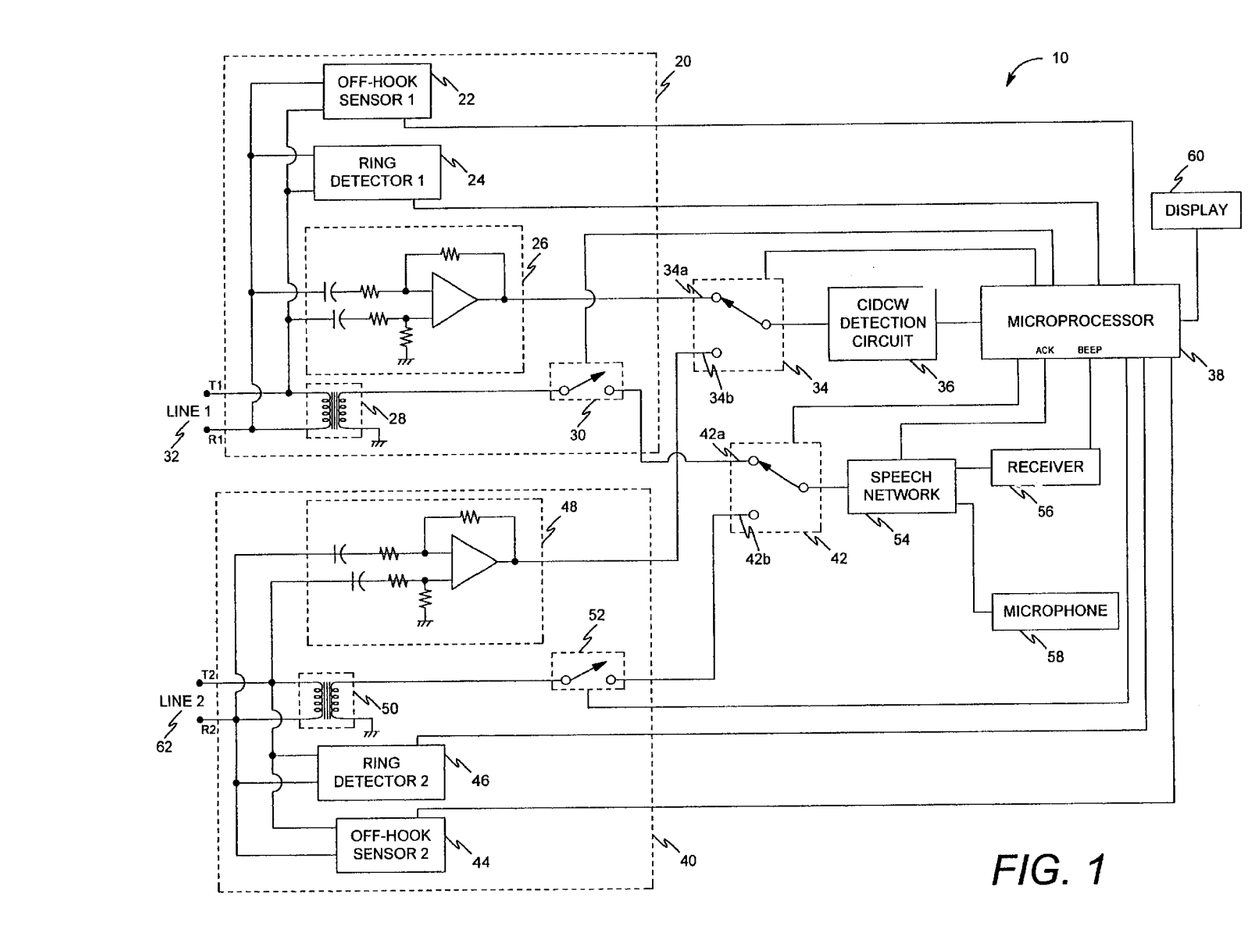
FIG. 1 is a block diagram of a two-line customer premises equipment (CPE) for providing caller identification (CID) information over two telephone lines in accordance with the present invention.

Referring to FIG. 1, a block diagram of a customer premises equipment (CPE) 10 for providing caller identification (CID) information over two telephone lines in accordance with a first embodiment of the present invention is shown. The CPE 10 includes a Line-1 circuit 20 coupled to the tip T1 and ring R1 leads of a first telephone line (Line-1) 32. The Line-1 circuit 20 includes a first off-hook sensor 22 operably coupled to both the tip and ring leads of the first telephone line 32 for determining whether the first telephone line 32 is in an "on-hook" or "off-hook" condition. This information is provided to a microprocessor 38. The Line-1 circuit also includes a first ring detector 24 operably coupled to both the tip and ring leads of the first telephone line 32. The ring detector 24 alerts the CPE 10 when an incoming call has arrived on the first telephone line 32 by providing ring detect signals to the microprocessor 38. The Line-1 circuit also includes a first AC line interface 26 operably coupled to both the tip and ring leads of the first telephone line 32 for passing AC signals, such as CPE alerting signal (CAS) tones and modulated CID information, to a first leg 34a of a first single pole double throw (SPDT) switch 34. The Line-1 circuit also includes a first transformer 28 operably coupled to the tip and ring leads of the first telephone line 32, and a first hook switch 30 coupled to the transformer for selectively passing signals provided by the transformer to a first leg 42a of a second SPDT switch 42.

The CPE 10 also includes a Line-2 circuit 40 coupled to the tip T2 and ring R2 leads of a second telephone line (Line 2) 54. The Line-2 circuit 40 is similar to the Line-1 circuit 20 in form and function. The Line-2 circuit 40 includes a second off-hook sensor 44, a second ring detector 46, a second AC line interface 48, a second transformer 50, and a second hook switch 52. The second AC line interface 48 passes AC signals from the second telephone line 62 to a second leg 34b of the first SPDT switch 34. The second hook switch 52, which is coupled to the transformer 50, selectively passes signals provided by the transformer to a second leg 42b of the second SPDT switch 42.

In one embodiment of the present invention, each of the first and second AC line interfaces, 26 and 48, comprises a differential amplifier circuit.

The CPE 10 further includes a caller identification and call-waiting (CIDCW) detection circuit 36 operatively coupled to the first SPDT switch 34. The CIDCW detection circuit 36 detects the CAS tones and CID information provided by the first and second AC line interfaces 26 and 48. Although in the preferred embodiment of the present invention the CIDCW detection circuit 36 is incorporated in a single integrated circuit (IC), the CIDCW detection circuit 36 may be comprised of a separate CAS detector and CID detector (that is, discrete components). In the case of Type I Caller ID (CID without the CW feature), the CIDCW detection circuit 36 may be replaced with a CID detection circuit.

Under the control of the microprocessor 38, the first SPDT switch 34 switches between the output of the first AC line interface 26 (i.e. first leg 34*a*) and the output of the second AC interface 48 (i.e. second leg 34*b*). The microprocessor 38 is operatively coupled to the CIDCW detection circuit 36, and depending on the position of the first SPDT switch 34, will process caller identification (CID) information received from either Line-1 (i.e. first telephone line 32) or Line-2 (i.e. second telephone line 62). The microprocessor 38 is also operatively coupled to a display 60 for displaying the received and processed CID information. Alternatively, concurrently or subsequently, the CID information may be provided by the microprocessor 38 to a different device (not shown) for further processing of the CID information (e.g., a memory for storage, CID voice announcement device, etc.).

The CPE 10 further includes a speech network 54 operatively coupled to the microprocessor 38 and the second SPDT switch 42. Under the control of the microprocessor 38, the second SPDT switch is alternately coupled between the output of the first hook switch 30 (i.e. first leg 42*a*) and the output of the second hook switch 52 (i.e. second leg 42*b*). A receiver 56 (e.g. an earphone or loudspeaker) is operatively coupled to the microprocessor 38 and the speech network 54 so that speech signals received from the telephone line circuits 20 and 40, via the second SPDT switch 42, may be processed and output by the receiver 56. A microphone 58 is operatively coupled to the speech network 54 so that microphone (transmit) speech signals may be processed and passed to the appropriate telephone line circuit 20 or 40, via the second SPDT switch 42.

After receiving notification of incoming CIDCW information via a CAS tone, the microprocessor 38 generates and transmits an acknowledgment signal (ACK) to the speech network 54 for transmission to the appropriate telephone line circuit 20 or 40. In addition, if CPE 10 is engaged on telephone line 32 or 62 when a second call is received on the same telephone line, the microprocessor 38 generates and transmits a tone (BEEP) to the receiver 56 in order to notify the user of the second incoming call on the engaged telephone line.

Figure 2:
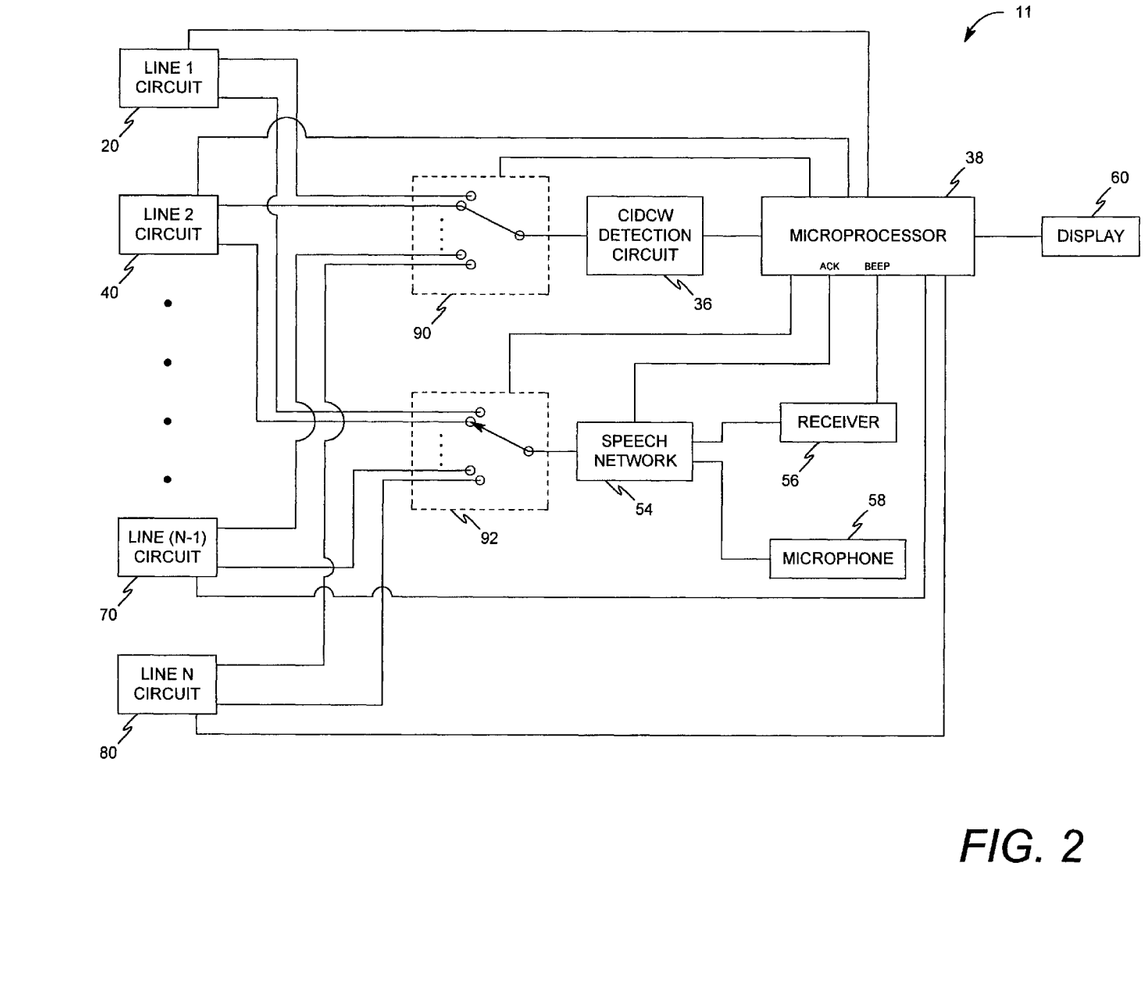
FIG. 2 is a block diagram of a portion of an N-line CPE for providing CID information over N-telephone lines in accordance with the present invention.

Referring now to FIG. 2, a block diagram of a CPE 11 in accordance with a second embodiment of the present invention is shown. FIG. 2 is similar to FIG. 1 except that the two-line embodiment is expanded to accommodate a plurality of telephone lines (i.e. N telephone lines), by employing switching devices capable of coupling to N telephone lines and increasing the number of circuit elements, as required, to accommodate the N telephone lines.

The CPE 11 in accordance with the second embodiment includes a plurality of telephone line circuits coupled to a plurality of telephone lines (not shown) in a manner similar to the Line-1 circuit 20 (or Line-2 circuit 40) of FIG. 1. For example, for a six-line telephone, the first telephone line will connect to Line-1 circuit 20, the second telephone line will connect to Line-2 circuit 40, and so on. The fifth telephone line will connect to Line-(N–1) circuit 70 and the sixth telephone line will connect to Line-N circuit 80.

Similar in form and function to the telephone line circuits 20 and 40 in FIG. 1, the line circuits of FIG. 2 (20, 40, 70 and 80) each include an off-hook sensor, a ring detector, an AC line interface, a transformer, and a hook switch.

In the second embodiment shown in FIG. 2, the first SPDT switch 34 (FIG. 1) is replaced with a first single pole, N-throw (SPNT) switch 90, where N is equal to the number of telephone lines connected to CPE 11. The second SPDT switch 42 of FIG. 1, is replaced with a second SPNT switch 92. The balance of the CPE 11 circuitry is similar in form and function to that of CPE 10 of FIG. 1. Specifically, the CPE 11 includes CIDCW detection circuit 36, microprocessor 38, speech network 54, receiver 56, microphone 58, and display 60. As was mentioned in connection with the first embodiment, the CIDCW detection circuit 36 of the second embodiment may comprise a separate CAS detector and CID detector, and in the case of Type I Caller ID, the CIDCW detection circuit 36 may be replaced with a CID detection circuit.

Figure 3:
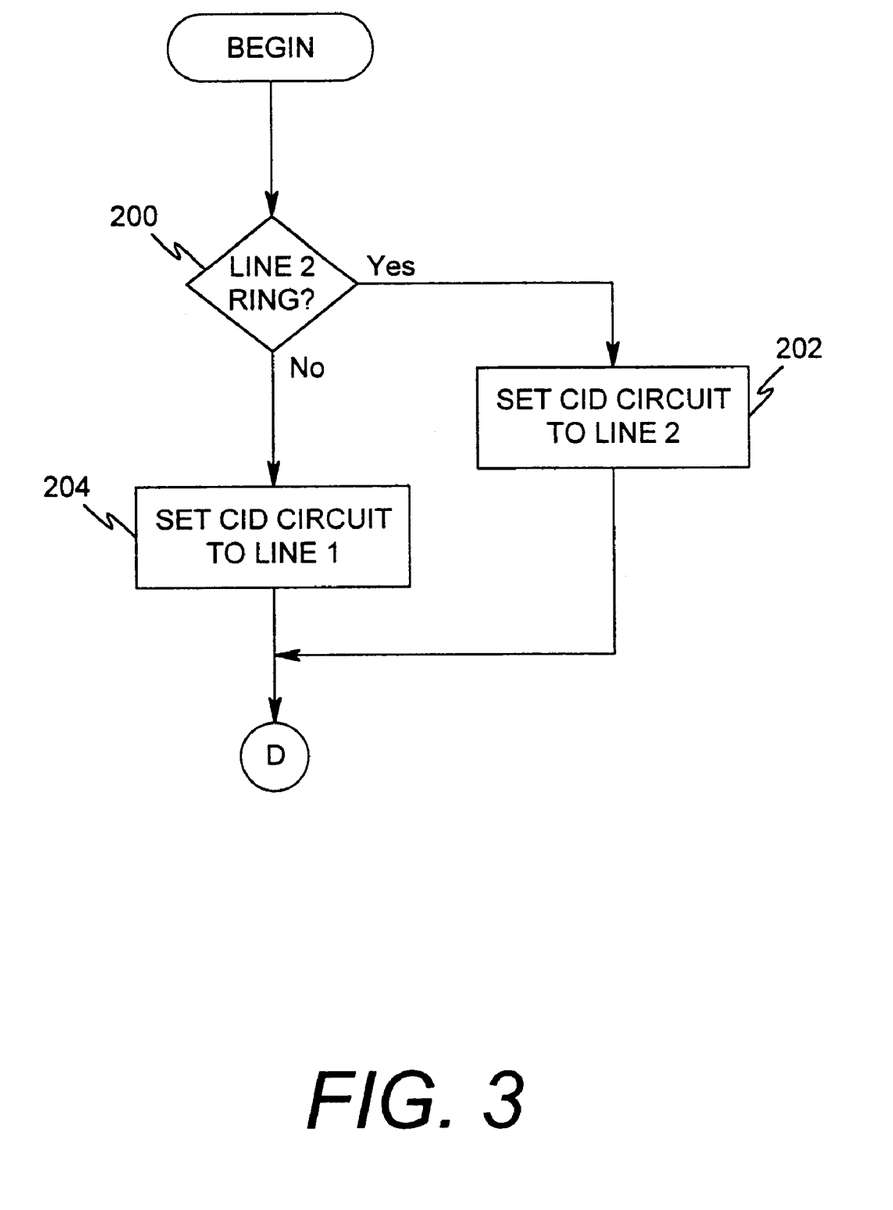
FIG. 3 is a flow diagram showing an embodiment of the operation of a two-line CID CPE for switching the two-line CID CPE's CID circuitry between two telephone lines having the CID feature enabled on both telephone lines, in accordance with the present invention.

Referring now to FIG. 3, a flow diagram illustrating the operation of a two-line CID CPE for switching the two-line CID CPE's CID circuitry between two telephone lines having the CID feature enabled on both telephone lines in accordance with the present invention is shown. Initially, the CPE (ring detector 2, 46) determines if there is a ring signal on telephone Line-2 (Step 200). If there is a ring signal on Line-2 (YES in Step 200), a CID switch couples the CID circuit to Line-2 (Step 202) and the CPE checks for any CID information (Step D). At Step 200, if there is no incoming call on Line-2 (NO in Step 200), the CID switch couples the CID circuit to telephone Line-1 (Step 204) and the CPE checks for any CID information (Step D). Therefore, the CPE sets the CID switch to couple the CID circuit to Line-1 unless there is a ring signal on Line-2.

Figure 4:
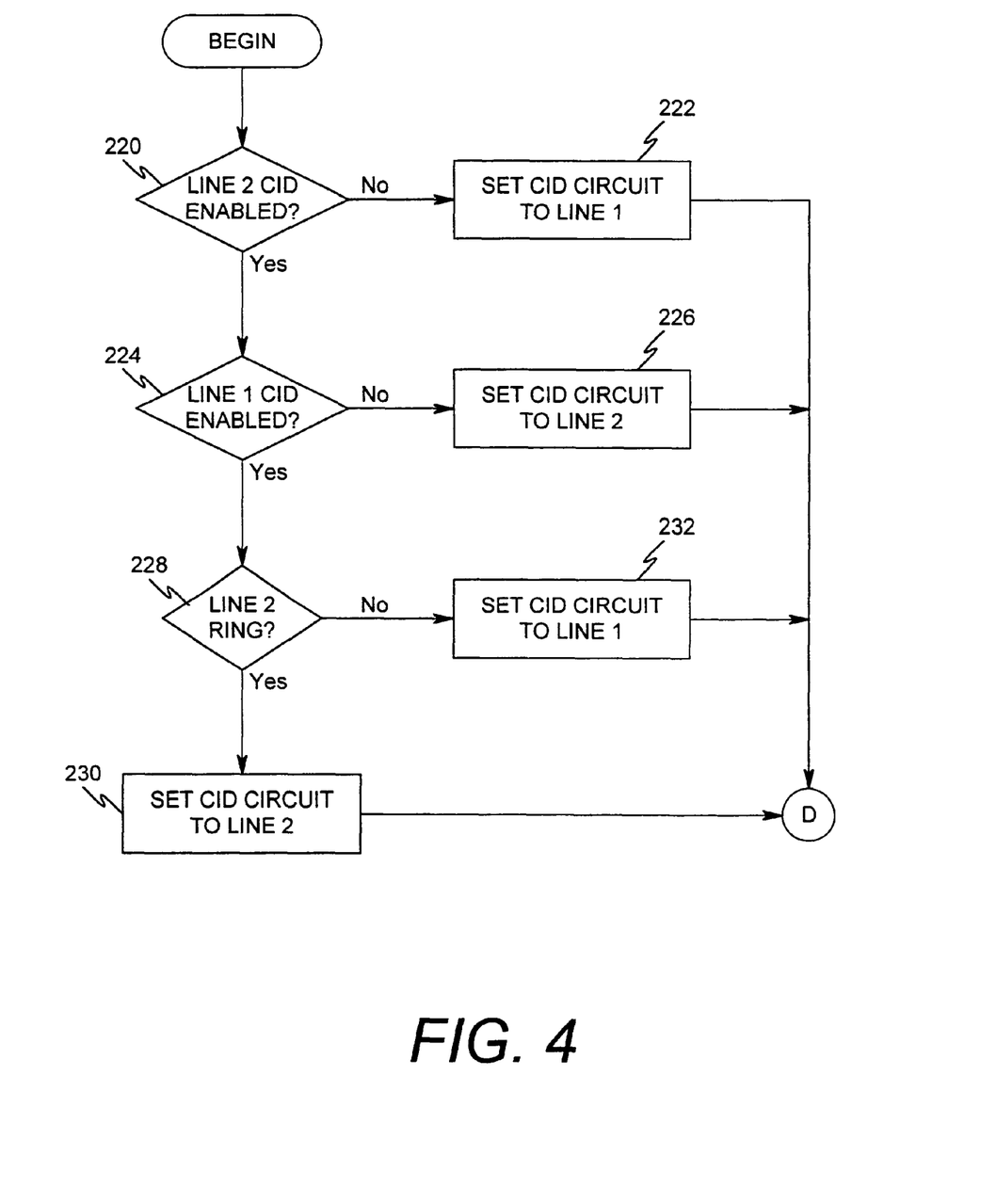
FIG. 4 is a flow diagram showing an embodiment of the operation of a two-line CID CPE for switching the two-line CID CPE's CID circuitry between two telephone lines, depending on whether the CID feature is enabled or disabled on the telephone lines, in accordance with the present invention.

Referring now to FIG. 4, a flow diagram illustrating the operation of a two-line CID CPE for switching the two-line CID CPE's CID circuitry between two telephone lines, depending on whether the CID feature is enabled or disabled on the telephone lines, in accordance with the present invention is shown. Initially, the CPE determines if the CID feature is enabled for Line-2 (Step 220). If the CID feature is disabled for Line-2 (NO in Step 220), Line-2 will not receive CID data. Therefore, the CID switch always couples the CID circuit to Line-1 (Step 222) and the CPE checks for any CID information (Step D). At Step 220, if the CID feature is enabled for Line-2 (YES in Step 220), the CPE determines if the CID feature is also enabled for Line-1 (Step 224). If the CID feature is disabled for Line-1 (NO in Step 224), Line-1 never receives CID data. Therefore, the CID switch always couples the CID circuit to Line-2 (Step 226) and the CPE checks for any CID information (Step D). At Step 224, if the CID feature on Line-1 is enabled (YES in Step 224) which indicates that the CID feature of both Line-1 and Line-2 are enabled, the CPE determines if there is a ring signal on telephone Line-2 (Step 228). If there is a ring signal on Line-2 (YES in Step 228), a CID switch couples the CID circuit to Line-2 (Step 230) and the CPE checks for any CID information (Step D). At Step 228, if there is no incoming call on Line-2 (NO in Step 228), the CID switch couples the CID circuit to telephone Line-1 (Step 232) and the CPE checks for any CID information (Step D).

Figure 5:
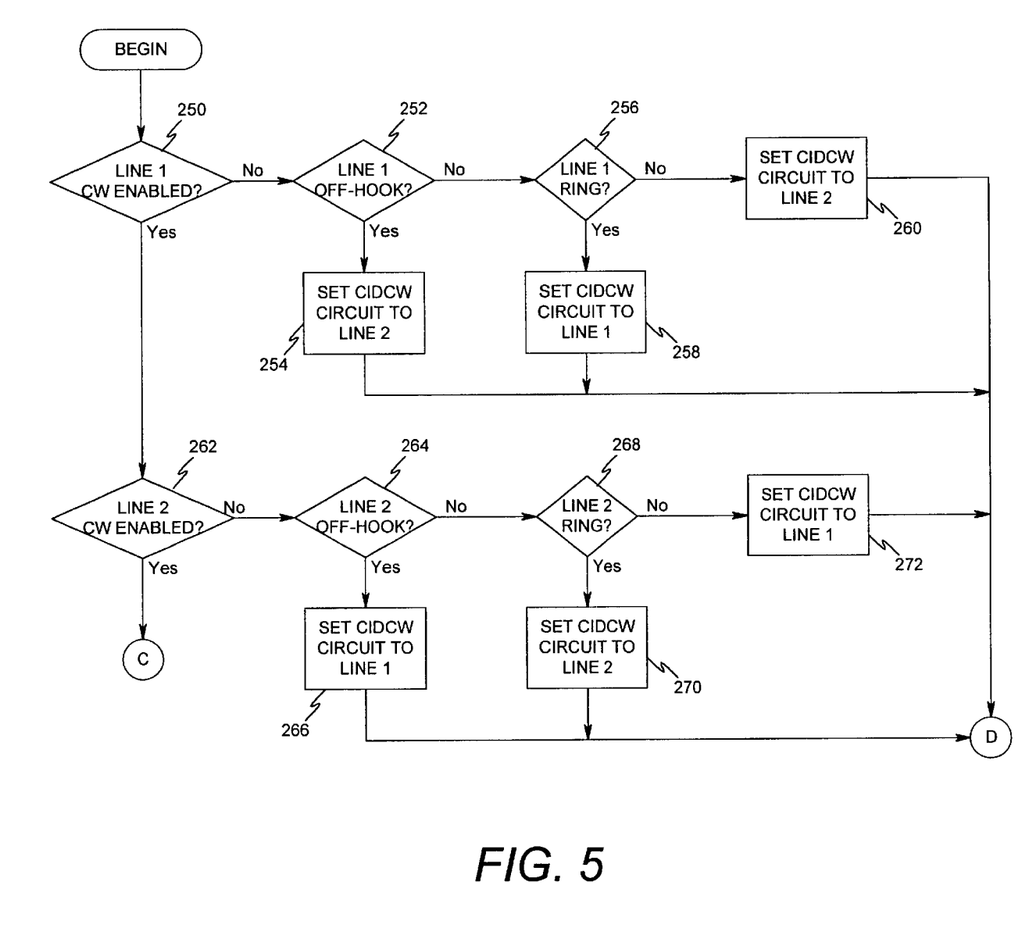
FIG. 5 is a partial flow diagram showing an embodiment of the operation of a two-line CIDCW CPE for switching the two-line CIDCW CPE's CID circuitry between two telephone lines, depending on whether the CW feature is enabled or disabled on the telephone lines, in accordance with the present invention.

Referring now to FIG. 5, a partial flow diagram illustrating the operation of a two-line CIDCW CPE for switching the two-line CIDCW CPE's CID circuitry between two telephone lines, depending on whether the CW feature is enabled or disabled, in accordance with the present invention is shown. Initially, the CPE determines if the CW feature is enabled for Line-1 (Step 250). If the CW feature is disabled for Line-1 (NO in Step 250), the CPE determines if Line-1 is in an off-hook condition (Step 252). If Line-1 is off-hook (YES in Step 252), since the CW feature is disabled for Line-1 and will not be able to receive CID data over the occupied telephone line, a CID switch couples the CIDCW circuit to Line-2 (Step 254) and the CPE checks for any CID information (Step D). At Step 252, if Line-1 is on-hook (NO in Step 252), the CPE determines if there is a ring signal on Line-1 (Step 256). If there is a ring signal on Line-1 (YES in Step 256), the CID switch couples the CIDCW circuit to Line-1 (Step 258) and the CPE checks for any CID information (Step D). At Step 256, if there is no incoming call on Line-1 (NO in Step 256), the CID switch couples the CIDCW circuit to Line-2 (Step 260) and the CPE checks for a CAS tone or any CID information (Step D).

Referring again to Step 250, if the CW feature is enabled for Line-1 (YES in Step 250), the CPE determines if the CW feature is also enabled for Line-2 (Step 262). If the CW feature is enabled for Line-2 (YES in Step 262), the method must arbitrate further to determine which telephone line to couple the CID circuit (Step C) At Step 262, if the CW feature is disabled for Line-2 (NO in Step 262), the CPE determines if Line-2 is in an off-hook condition (Step 264). If Line-2 is off-hook (YES in Step 264), since the CW feature is disabled for Line-2 and will not be able to receive CID data over the occupied telephone line, a CID switch couples the CIDCW circuit to Line-1 (Step 266) and the CPE checks for a CAS tone or any CID information (Step D). At Step 264, if Line-2 is on-hook (NO in Step 264), the CPE determines if there is a ring signal on Line-2 (Step 268). If there is a ring signal on Line-2 (YES in Step 268), the CID switch couples the CIDCW circuit to Line-2 (Step 270) and the CPE checks for any CID data (Step D). At Step 268, if there is no incoming call on Line-2 (NO in Step 268), the CID switch couples the CIDCW circuit to Line-1 (Step 272) and the CPE checks for a CAS tone or any CID information (Step D).

Figure 6:
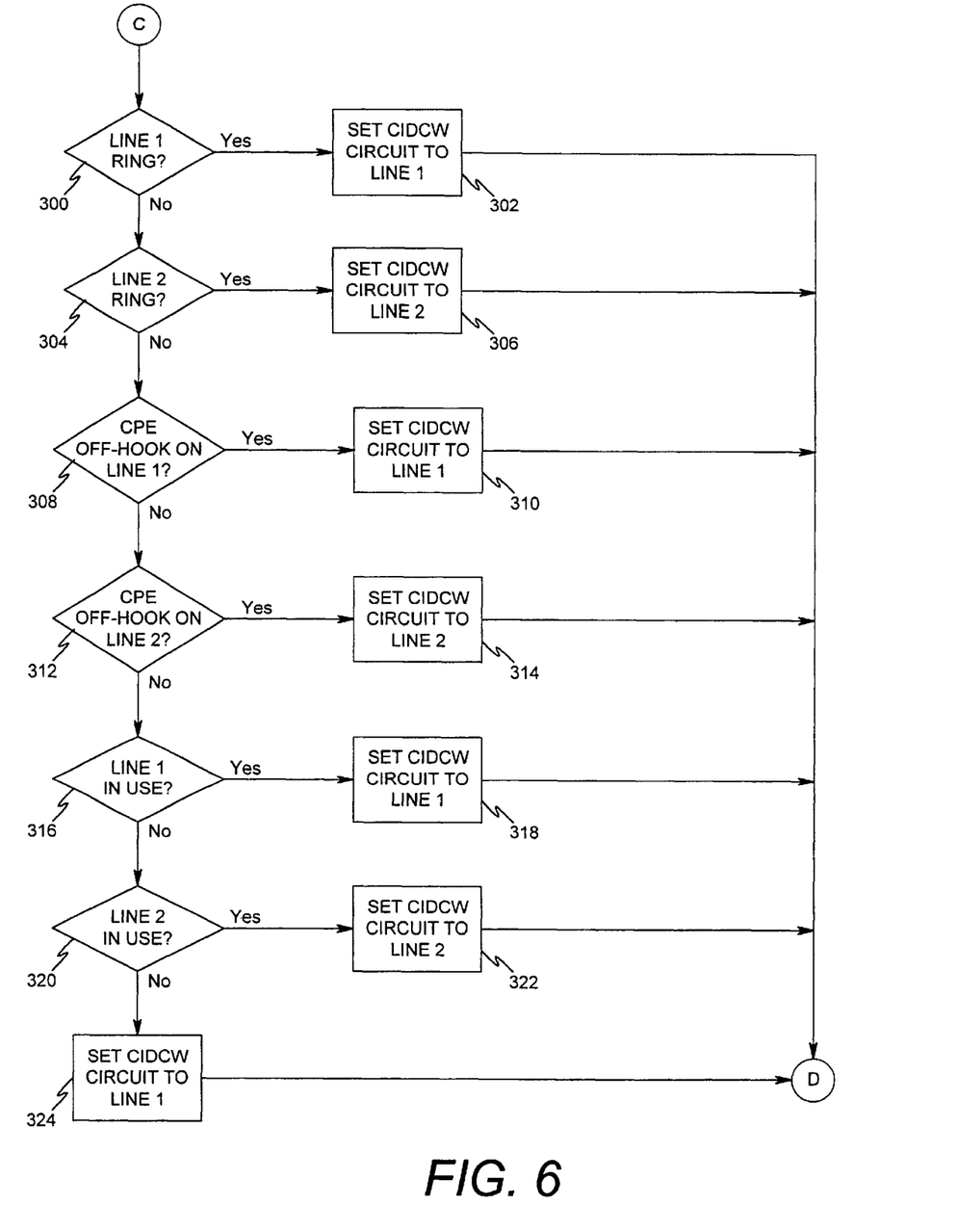
FIG. 6 is a flow diagram showing a continuation of the partial flow diagram of FIG. 5 if the CIDCW feature is enabled on both telephone lines in accordance with the present invention.

Referring now to FIG. 6, a flow diagram which continues the flow diagram of FIG. 5 for the case where the CIDCW feature is enabled on both telephone lines in accordance with the present invention is shown. The CPE determines if there is a ring signal on telephone Line-1 (Step 300). If there is a ring signal on Line-1 (YES in Step 300), the CIDCW circuit is coupled to Line-1 (Step 302) and the CPE checks for any CID information (Step D). At Step 300, if there is no incoming call on Line-1 (NO in Step 300), the CPE determines if there is a ring signal on telephone Line-2 (Step 304). If there is a ring signal on Line-2 (YES in Step 304), the CIDCW circuit is coupled to Line-2 (Step 306) and the CPE checks for any CID information (Step D). At Step 304, if there is no incoming call on Line-2 (NO in Step 304), the CPE determines if the CPE is off-hook on Line-1 (Step 308). If the CPE is off-hook on Line-1 (YES in Step 308), then the CIDCW circuit is coupled to Line-1 (Step 310) in order to detect a second incoming call (via a CAS tone) on Line-1 (Step D). At Step 308, if the CPE is on-hook on Line-1 (NO in Step 308), the CPE determines if it is off-hook on Line-2 (Step 312). If the CPE is off-hook on Line-2 (YES in Step 312), then the CIDCW circuit is coupled to Line-2 (Step 314) in order to detect a second incoming call (via a CAS tone) on Line-2 (Step D). At Step 312, if the CPE is on-hook on Line-2 (NO in Step 312), the CPE determines if Line-1 is in use (i.e. another CPE is off-hook on Line-1) (Step 316). If Line-1 is in use (YES in Step 316), the CIDCW circuit is coupled to Line-1 (Step 318) and the CPE checks for any CID information (Step D). If Line-1 is not in use (NO in Step 316), the CPE determines if Line-2 is in use (Step 320). At Step 320, if Line-2 is in use (YES in Step 320), the CIDCW circuit is coupled to Line-2 (Step 322) and the CPE checks for any CID information (Step D). If Line-2 is not in use (NO in Step 320), the CIDCW circuit is coupled to Line-1 (Step 324).

Figure 7:
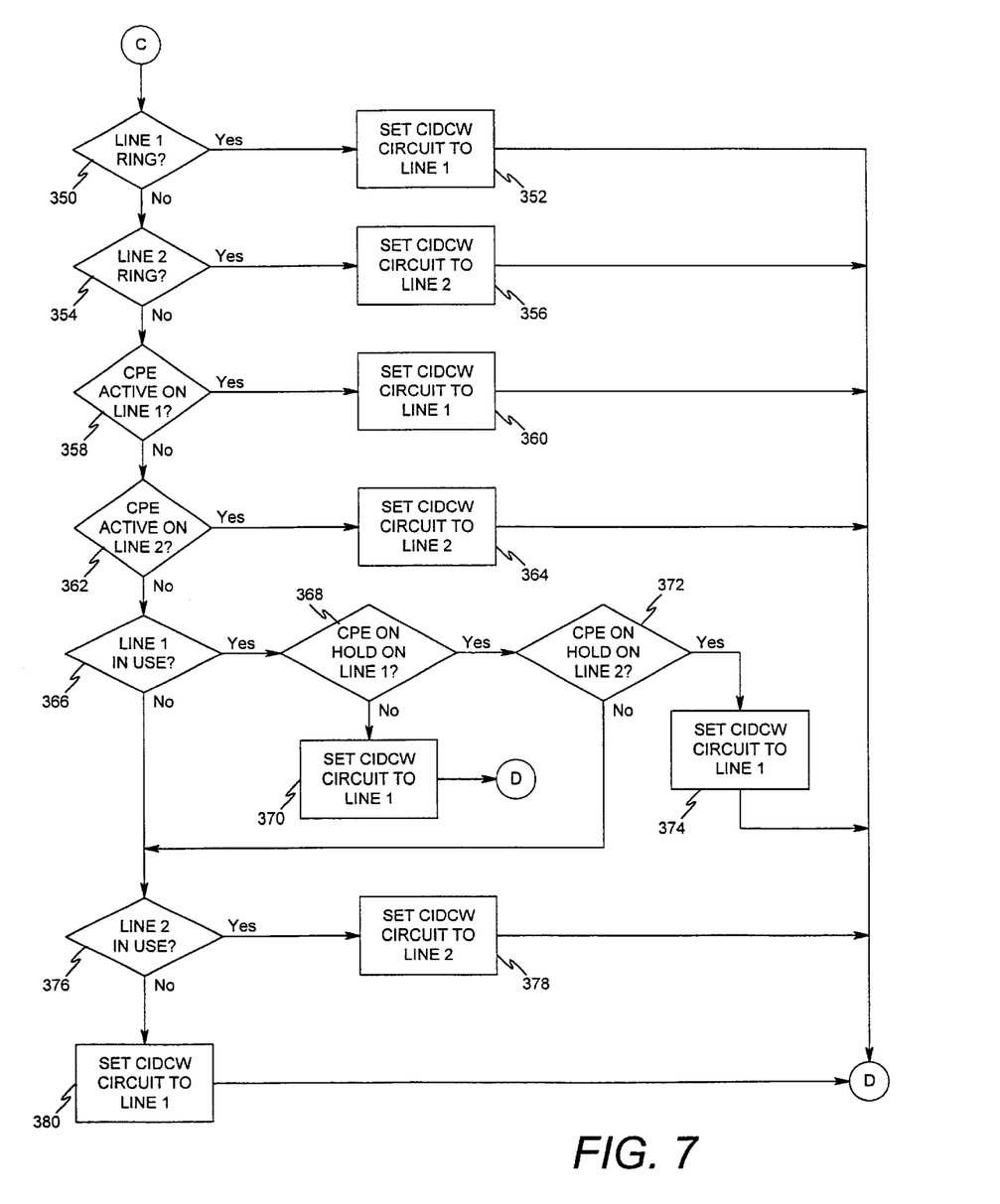
FIG. 7 is a flow diagram showing a continuation of the partial flow diagram of FIG. 5 if the CIDCW feature is enabled on both telephone lines for a two-line CPE having a hold feature for each of the telephone lines, in accordance with the present invention.

Referring now to FIG. 7, a flow diagram which continues the flow diagram of FIG. 5 for the case where the CIDCW feature is enabled on both telephone lines and the CPE has a hold feature for each of the telephone lines in accordance with the present invention is shown. Initially, the CPE determines if there is a ring signal on telephone Line-1 (Step 350). If there is a ring signal on Line-1 (YES in Step 352), the CIDCW circuit is coupled to Line-1 (Step 352) and the CPE checks for any CID information (Step D). At Step 350, if there is no incoming call on Line-1 (NO in Step 350), the CPE determines if there is a ring signal on telephone Line-2 (Step 354). If there is a ring signal on Line-2 (YES in Step 354), the CIDCW circuit is coupled to Line-2 (Step 356) and the CPE checks for any CID information (Step D). At Step 354, if there is no incoming call on Line-2 (NO in Step 354), the CPE determines if the CPE is "active" on Line-1 (Step 358). That is, the CPE determines if the CPE is off-hook but not on hold. If the CPE is active on Line-1 (YES in Step 358), then the CIDCW circuit is coupled to Line-1 (Step 360) in order to be able to receive CID information from a second call on Line-1 (Step D). At Step 358, if the CPE is not active on Line-1 (NO in Step 358), the CPE determines if it is active on Line-2 (Step 362). If the CPE is active on Line-2 (YES in Step 362), then the CIDCW circuit is coupled to Line-2 (Step 364) in order to be able to receive CID information from a second call on Line-2 (Step D). At Step 362, if the CPE is not active on Line-2 (NO in Step 362), the CPE determines if Line-1 is in use (i.e. off-hook) (Step 366). If Line-1 is in use (YES in Step 366), the CPE determines if Line-1 of the CPE is on hold (Step 368). If Line-1 of the CPE is not on hold (NO in Step 368), the CIDCW circuit is coupled to Line-1 (Step 370) and the CPE checks for a CAS tone or any CID information (Step D). At Step 368, if Line-1 of the CPE is on hold (YES in Step 368), the CPE determines if Line-2 of the CPE is on hold (Step 372). If Line-2 of the CPE is on hold (YES in Step 372), the CIDCW circuit is coupled to Line-1 (Step 374) and the CPE checks for a CAS tone or any CID information (Step D). At Step 372, if the CPE is not on hold on Line-2 (NO in Step 372), the CPE determines if Line-2 is in use (Step 376).

Once the CPE determines that a) Line-1 is not in use; or b) Line-1 of the CPE is on hold but Line-2 of the CPE is not on hold (either NO in Step 366 or NO in Step 372), the CPE determines if Line-2 is in use (Step 376). If Line-2 is in use (YES in Step 376), the CIDCW circuit is coupled to Line-2 (Step 378) and the CPE checks for a CAS tone or any CID information (Step D). At Step 376, if Line-2 is not in use (NO in Step 376), the CIDCW circuit is coupled to Line-1 (Step 380) and the CPE checks for any CID information (Step D).

The CPE prioritizes the events that determine when the CID circuit will be coupled to any given telephone line. In the preferred embodiment of the invention, the order of priority is: 1) whether a ring signal is received on a telephone line; 2) whether the CPE is off-hook on a telephone line; 3) whether there is a telephone line in use on a telephone line in which the CPE is not on hold; and 4) whether the CPE is on hold on a telephone line. In the preferred embodiment, if both telephone lines are of the same priority, higher consideration is given to Line-1 over Line-2. Of course, Line-2 could just as well be given higher priority without affecting the scope of the present invention.

Figure 8A:
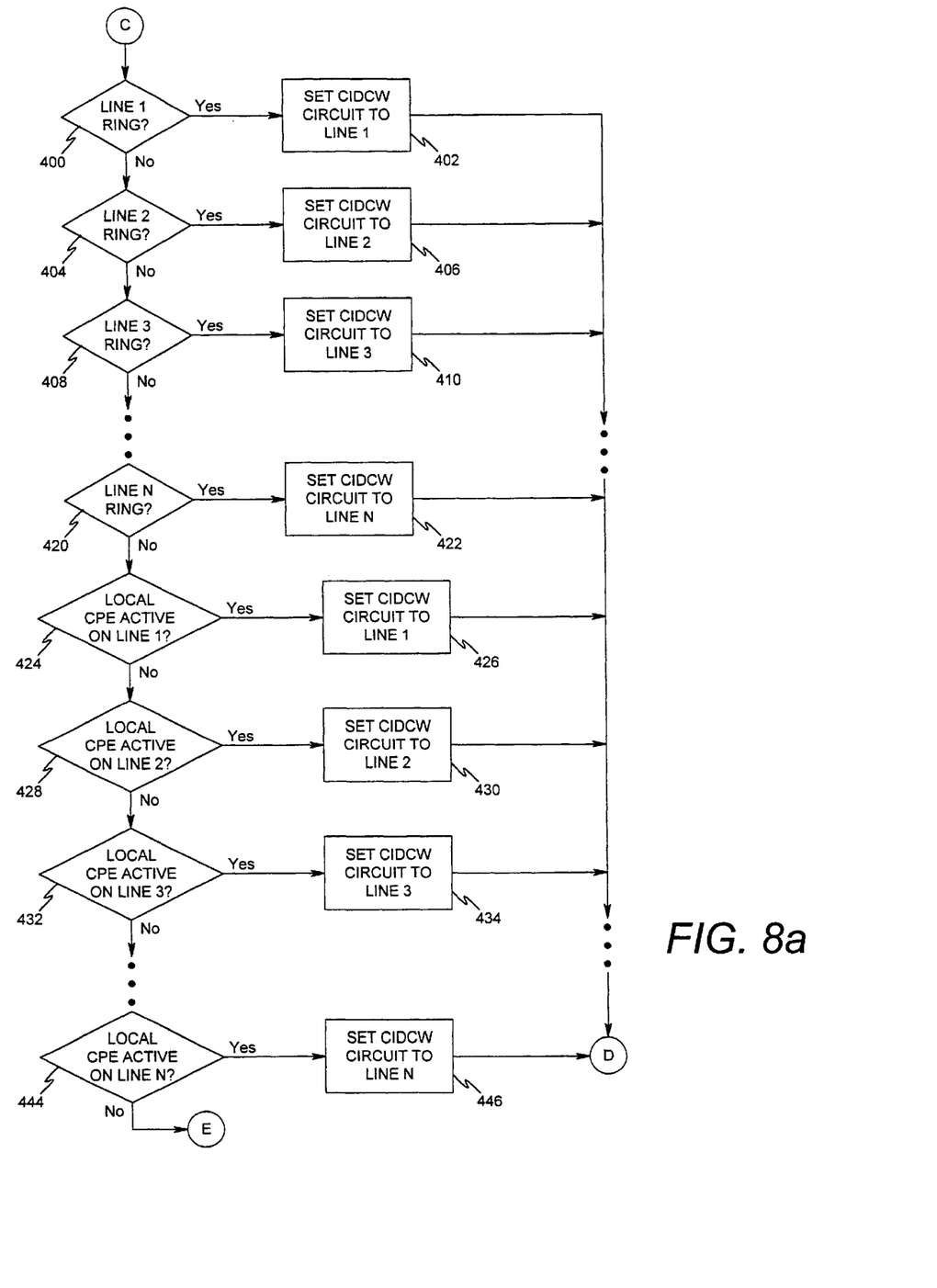
FIG. 8a is a partial flow diagram showing an embodiment of the operation of an N-line CIDCW CPE for switching the N-line CIDCW CPE's CID circuitry between N-telephone lines, each telephone line having the CIDCW feature enabled, in accordance with the present invention.
Figure 8B:
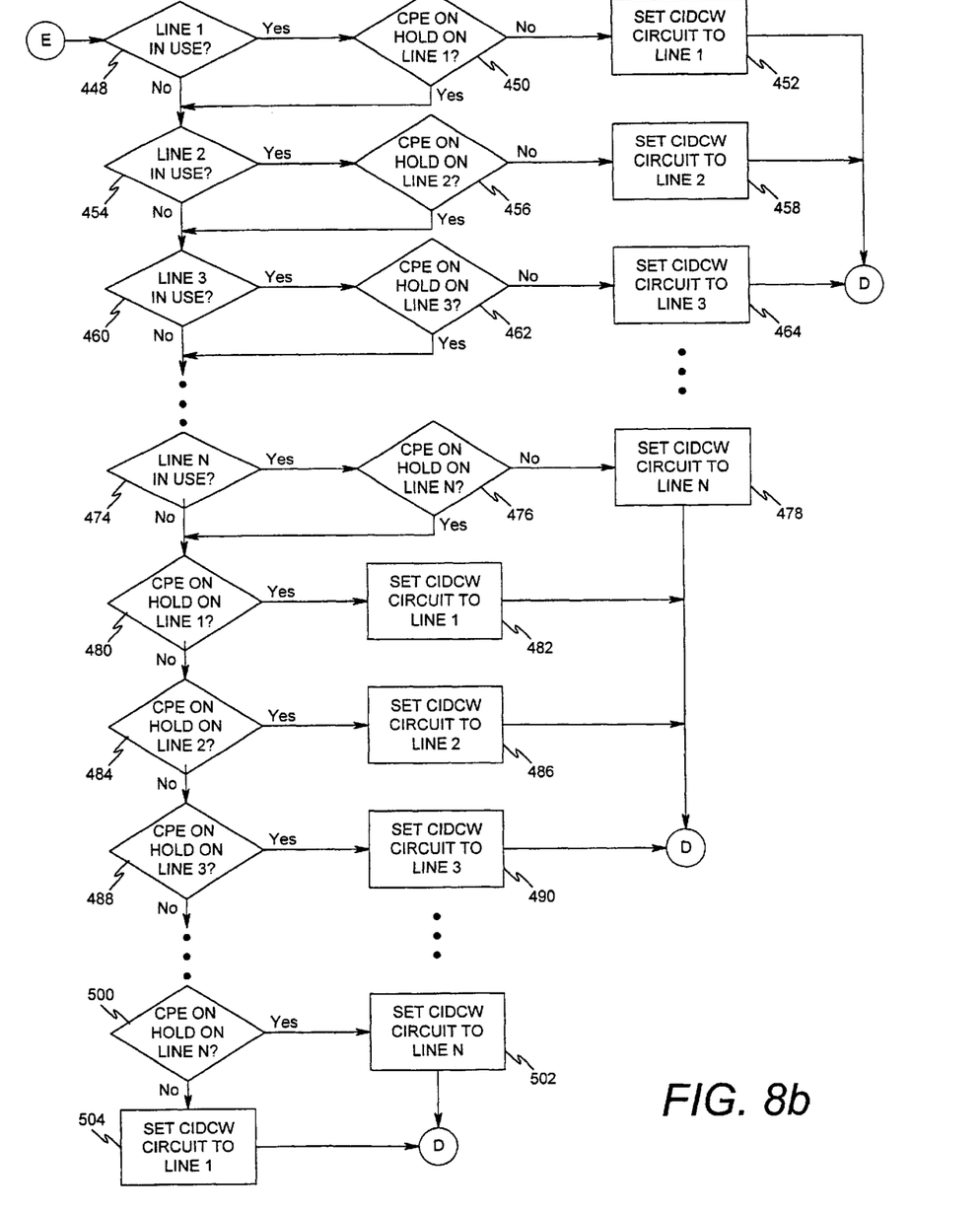

Referring now to FIGS. 8a and 8b, a flow diagram illustrating the operation of an N-line CPE for switching the N-line CPE's CIDCW circuitry between N telephone lines, depending on whether the CIDCW feature is enabled or disabled, in accordance with the present invention is shown. FIGS. 8a and 8b are similar to FIG. 7 except that the two-line embodiment is expanded to accommodate a plurality of telephone lines (i.e. N telephone lines). The order of priorities in determining when the CIDCW circuit will be coupled to any given telephone line is the same as for the two-line CPE. Specifically, the order of priorities: is 1) whether a ring signal is received on a telephone line (Steps 400–422); 2) whether the CPE is active on a telephone line (Steps 424–446); 3) whether there is a telephone line in use in which the CPE is not on hold (Steps 448–478); and 4) whether the CPE is on hold on a telephone line (Steps 480–502). If none of the preceding priorities apply, the CIDCW circuit will be coupled to Line-1 (Step 504) and the CPE checks for any CID information (Step D).

In the preferred embodiment, when there are multiple lines of the same priority, the lower numbered telephone line is given first consideration. For example, if Line-2 and Line-4 both receive ring signals at the same time, the CIDCW circuit will be coupled to Line-2 (the lower numbered telephone line).

It will be appreciated that a set of priorities may be established for a CPE that has CID without the CW feature. In such a case, the priorities are preferably: 1) whether a ring signal is received on a telephone line; and 2) whether the CPE is on-hook on a telephone line, ordered respectively.

Figure 9:
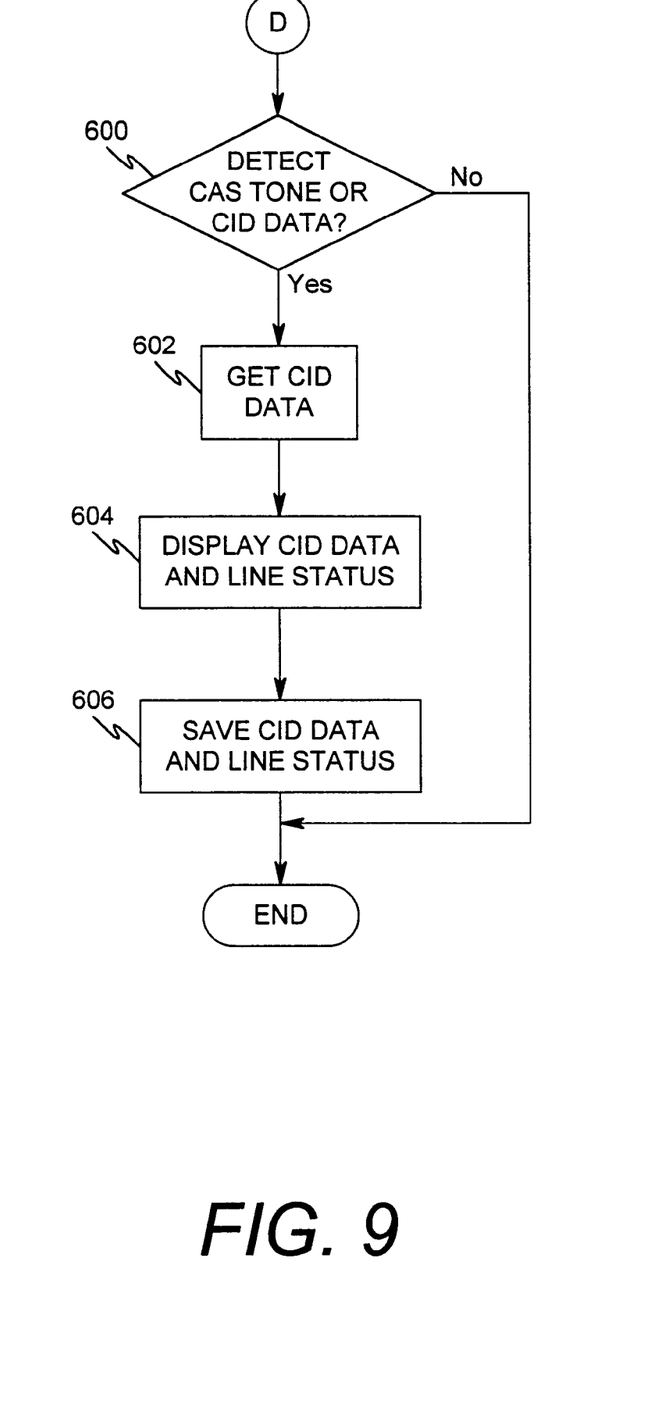
FIG. 9 is a flow diagram showing an embodiment of the operation for processing and displaying CID information, including the telephone line on which the CID information was received, in accordance with the present invention.

Referring now to FIG. 9, a flow diagram illustrating the operation for processing and displaying CID information, including the telephone line on which the CID information was received, in accordance with the present invention is shown. Once the CID circuit is operatively connected to a telephone line, the CPE checks for a CAS tone, CID information, or other modulated signals sent from the central office (Step 600). If such modulated signals are not detected (NO in Step 600), the operation is abandoned and the method ends. At Step 600, if modulated signals are detected (YES in Step 600), the signals (i.e. CID data) are received and processed (Step 602) for display by the CPE (Step 604). At Step 604, the CPE also displays the appropriate telephone line in which the CID data was received (line status). The CID data and telephone line status are then stored for further processing (Step 606) and the method ends. The method of receiving, processing and displaying the CID data is well known in the art and therefore need not be explained in detail herein.

Having described the principles and preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as defined in the appended claims.

What is claimed is:

1. A consumer premises equipment (CPE) for receiving caller identification (CID) information from a plurality of telephone lines, said CPE comprising:
   a plurality of telephone line circuits corresponding to the plurality of telephone lines for receiving at least one of CID information and CPE alerting signal (CAS) tones from said plurality of telephone lines;
   a single detector for detecting said CID information and CAS tones from said plurality of telephone lines;
   a microprocessor coupled to said single detector and said plurality of telephone line circuits, the microprocessor providing a control signal;
   a switch coupled to said microprocessor and being interposed between the single detector and the plurality of telephone line circuits and being responsive to said control signal, for operatively switchably coupling one of said plurality of telephone line circuits to said single detector
   wherein said switch dynamically selects and operatively switchably couples one of said plurality of the telephone line circuits to said detector based on a primary set of priorities.

2. The CPE as defined by claim 1, wherein one of said plurality of telephone line circuits has a higher priority in comparison to the other of said plurality of telephone line circuits, and wherein said one of said plurality of telephone line circuits is operatively coupled to said single detector.

3. The CPE as defined by claim 1, wherein said set of primary priorities comprises:
   a. setting said switch to operatively couple said single detector to one of said plurality of telephone line circuits that is receiving a ring signal from a corresponding one of the plurality of telephone lines; and
   b. setting said switch to operatively couple said detector to one of said plurality of telephone line circuits in which the CPE is off-hook but not on hold.

4. The CPE as defined by claim 3, wherein said primary set of priorities further comprises setting said switch to operatively couple said single detector to one of said plurality of telephone line circuits having said CPE on-hook on one of said plurality of telephone lines that is off-hook.

5. The CPE as defined by claim 4, wherein said primary set of priorities further comprises setting said switch to operatively couple said single detector to one of said plurality of telephone line circuits in which the CPE is on hold on one of said plurality of telephone lines.

6. The CPE as defined by claim 5, wherein said CPE being on-hook on one of said plurality of telephone lines that is off-hook is given a higher priority than said CPE being on hold on one of said plurality of telephone lines.

7. The CPE as defined by claim 3, wherein said reception of said ring signal on one of said plurality of telephone lines is a higher priority than said CPE being off-hook but not on hold on one of said plurality of telephone lines.

8. The CPE as defined by claim 4, wherein said CPE being off-hook but not on hold on one of the plurality of telephone lines is a higher priority than having said CPE on-hook on one of said plurality of telephone lines that is off-hook.

9. The CPE as defined by claim 1, further comprising a secondary set of priorities such that when there are approximately simultaneous multiple telephone line circuits with equal but higher priorities in comparison to the other of said plurality of telephone line circuits, said switch operatively couples one of said multiple telephone line circuits to said single detector further based on a highest of said secondary set of priorities.

10. The CPE as defined by claim 9, wherein said secondary set of priorities comprises assigning a priority level to each of said plurality of telephone line circuits.

11. The CPE as defined by claim 1, wherein said switch operatively couples said single detector to a default telephone line circuit when all of said plurality of telephone lines are on-hook and not receiving a ring signal.

12. The CPE as defined by claim 1, wherein said switch may be prevented from coupling a telephone line circuit to said single detector.

13. A consumer premises equipment (CPE) for receiving caller identification (CID) information from a plurality of telephone lines, said CPE comprising:
   a plurality of telephone line circuits corresponding to the plurality of telephone lines for receiving CID information from said plurality of telephone lines;
   a single detector for detecting said CID information provided by said plurality of telephone lines;
   a microprocessor being coupled to said single detector and said plurality of telephone line circuits, the microprocessor providing a control signal;
   a switch coupled to said microprocessor and being interposed between the single detector and the plurality of telephone line circuits, and being responsive to said control signal, for operatively switchably coupling one of said plurality of telephone line circuits to said single detector
   wherein said switch dynamically selects and operatively switchably couples one of said plurality of the telephone line circuits to said detector based on a primary set of priorities.

14. The CPE as defined by claim 13, wherein one of said plurality of telephone line circuits has a higher priority in comparison to the other of said plurality of telephone line circuits, and wherein said one of said plurality of telephone line circuits is operatively coupled to said single detector.

15. The CPE as defined by claim 13, wherein said primary set of priorities includes:
   a. setting said switch to operatively couple said single detector to one of said plurality of telephone line circuits that is receiving a ring signal from a corresponding one of the plurality of telephone lines;
   b. setting said switch to operatively couple said single detector to one of said plurality of telephone line circuits in which the CPE is on-hook.

16. The CPE as defined by claim 15, wherein said reception of said ring signal on one of said plurality of telephone lines is a higher priority than said CPE being on-hook on one of said plurality of telephone lines.

17. The CPE as defined by claim 13, further comprising a secondary set of priorities such that when there are approximately simultaneous multiple telephone line circuits with equal but higher priorities in comparison to the other of said plurality of telephone line circuits, said switch operatively couples one of said multiple telephone line circuits to said detector further based on a highest of said secondary set of priorities.

18. The CPE as defined by claim 17, wherein said secondary set of priorities includes assigning a priority level to each of said plurality of telephone line circuits.

19. The CPE as defined by claim 13, wherein said switch operatively couples said single detector to a default telephone line circuit when all of said plurality of telephone lines are on-hook and not receiving a ring signal.

20. The CPE as defined by claim 13, wherein said switch may be prevented from coupling a telephone line circuit to said single detector.

21. A method for a consumer premises equipment (CPE) to receive caller identification (CID) information over a plurality of telephone lines, said method comprising the steps of:
   a. determining whether to dynamically select and couple a single detector to one of said plurality of telephone line circuits based upon a primary set of priorities;
   b. operatively coupling one of said plurality of telephone line circuits to said single detector; and
   c. utilizing a single detector to detect said CID information over a plurality of telephone lines.

22. The method as defined by claim 21, wherein step a comprises:
   comparing the status of said plurality of telephone lines; and
   determining a highest of said primary set of priorities on said plurality of telephone lines.

23. The method as defined by claim 22, further comprising:
   determining whether to couple said single detector to said one of a plurality of telephone line circuits based on a secondary set of priorities when there are multiple telephone line circuits with equal but higher priorities in comparison to the other of said plurality of telephone line circuits.

24. The method as defined by claim 23, wherein said secondary set of priorities comprises assigning a priority level to each of said plurality of telephone line circuits.

25. The method as defined by claim 22, wherein said primary set of priorities comprises:
   said CPE detecting a ring signal on any of said plurality of telephone lines; and
   said CPE being on-hook on any of said plurality of telephone lines.

26. The method as defined by claim 25, wherein said CPE detecting a ring signal on any of said plurality of telephone lines is determined to be a higher priority than said CPE being on-hook on any of said plurality of telephone lines.

27. The method as defined by claim 24, wherein said primary set of priorities comprises:
   said CPE detecting a ring signal on any one of said plurality of telephone lines; and
   said CPE being off-hook but not on hold on any of one of said plurality of telephone lines.

28. The method as defined by claim 27, wherein said primary set of priorities further comprises said CPE being on-hook on any of said plurality of telephone lines that is on-hook.

29. The method as defined by claim 28, wherein said CPE being off-hook but not on hold on any of the plurality of telephone lines is determined to be a higher priority than said CPE being on-hook on any of said plurality of telephone lines that is off-hook.

30. The method as defined by claim 27, wherein said CPE detecting a ring signal on any of said plurality of telephone lines is determined to be a higher priority than said CPE being off-hook but not on hold on any of said plurality of telephone lines.

31. The method as defined by claim 27, wherein said primary set of priorities further comprises said CPE being on-hold on any of said plurality of telephone lines.

32. The method as defined by claim 31, wherein said CPE being on-hook on any of said plurality of telephone lines is determined to be a higher priority than said CPE being on hold on any of said plurality of telephone lines.

33. The method as defined by claim 21, wherein said CPE couples said single detector to a default telephone line circuit when all of said plurality of telephone lines are on-hook and not receiving a ring signal.

34. The CPE as defined by claim 21, wherein the CPE prevents said switch from coupling a telephone line circuit from said single detector.

* * * * *